United States Patent
Deeke et al.

[19]

[11] Patent Number: 6,051,195
[45] Date of Patent: Apr. 18, 2000

[54] SYNTHESIS GAS HEAT EXCHANGER UNIT

[75] Inventors: Wolfgang Deeke, Mettmann; Wolfram Gruhlke, Toenis-Vorst; Jürgen Heering, Meerbusch; Klaus Köhnen, Mülheim, all of Germany

[73] Assignee: Man Gutehoffnungshutte Aktiengesellschaft, Germany

[21] Appl. No.: 08/980,003

[22] Filed: Nov. 26, 1997

[30] Foreign Application Priority Data

Nov. 29, 1996 [DE] Germany ............... 196 49 532

[51] Int. Cl.$^7$ ........................................... F28D 7/02
[52] U.S. Cl. .............................. 422/198; 48/67; 48/77; 55/267; 122/390; 122/392; 165/157
[58] Field of Search ..................... 422/198, 199; 202/81, 85, 91; 165/157; 48/67, 77; 55/267; 122/390, 392

[56] References Cited

U.S. PATENT DOCUMENTS

| | | | |
|---|---|---|---|
| 3,655,518 | 4/1972 | Schmalfeld et al. | 202/108 |
| 4,765,394 | 8/1988 | Ziegler | 165/95 |
| 4,863,489 | 9/1989 | Suggitt | 48/197 R |
| 4,993,479 | 2/1991 | Jekerie | 165/96 |
| 4,993,497 | 2/1991 | Jekerie | 165/96 |
| 5,251,575 | 10/1993 | Michel | 122/7 R |
| 5,394,686 | 3/1995 | Child et al. | 60/39.02 |

FOREIGN PATENT DOCUMENTS

| | | |
|---|---|---|
| 1112870 | 11/1981 | Canada . |
| 0 416 242 A1 | 3/1991 | European Pat. Off. . |
| 0 518 813 A1 | 12/1992 | European Pat. Off. . |
| 27 01 166 A1 | 7/1978 | Germany . |

*Primary Examiner*—Marian C. Knode
*Assistant Examiner*—Frederick Varcoe, Jr.
*Attorney, Agent, or Firm*—McGlew & Tuttle, P.C.

[57] ABSTRACT

The present invention pertains to a synthesis gas heat exchanger unit with one synthesis gas radiant cooler (1), two synthesis gas convection coolers (23), one crude gas-clean gas heat exchanger (4), one crude gas-inert gas heat exchanger (5), and one dust separator (11). These devices are preferably arranged vertically or slopingly. The crude gas heat exchangers (4, 5, 23) are designed as single-flue, double-flue or multiple-flue heat exchangers. They are elastically supported via claws (10) and are equipped with an electric heater (9). A soot blower system (13) is associated with each flue (4.1, 4.2) as well as (5.1, 5.2) and right hand flue and left hand flue (23.1, 23.2) at the crude gas inlet. Soot blowers (31) are likewise provided on the connection lines (2, 6), and mass flow controllers (7) are provided in the lower connection lines (6).

8 Claims, 4 Drawing Sheets

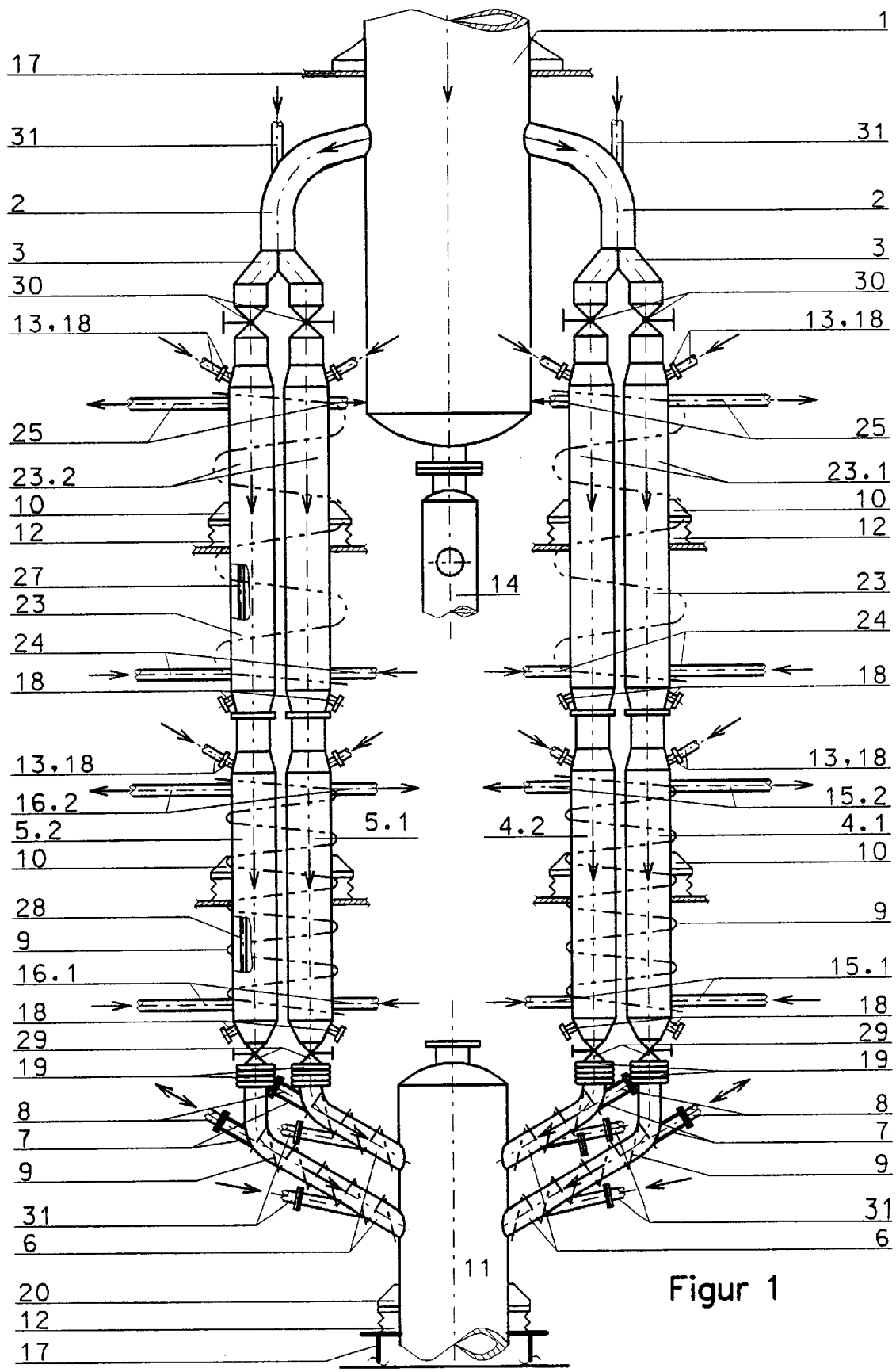
Figur 1

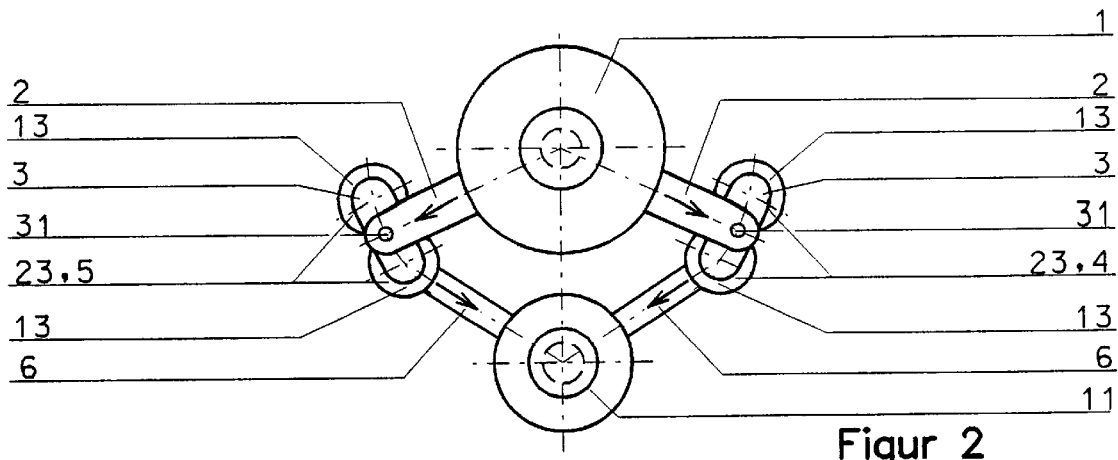
Figur 2
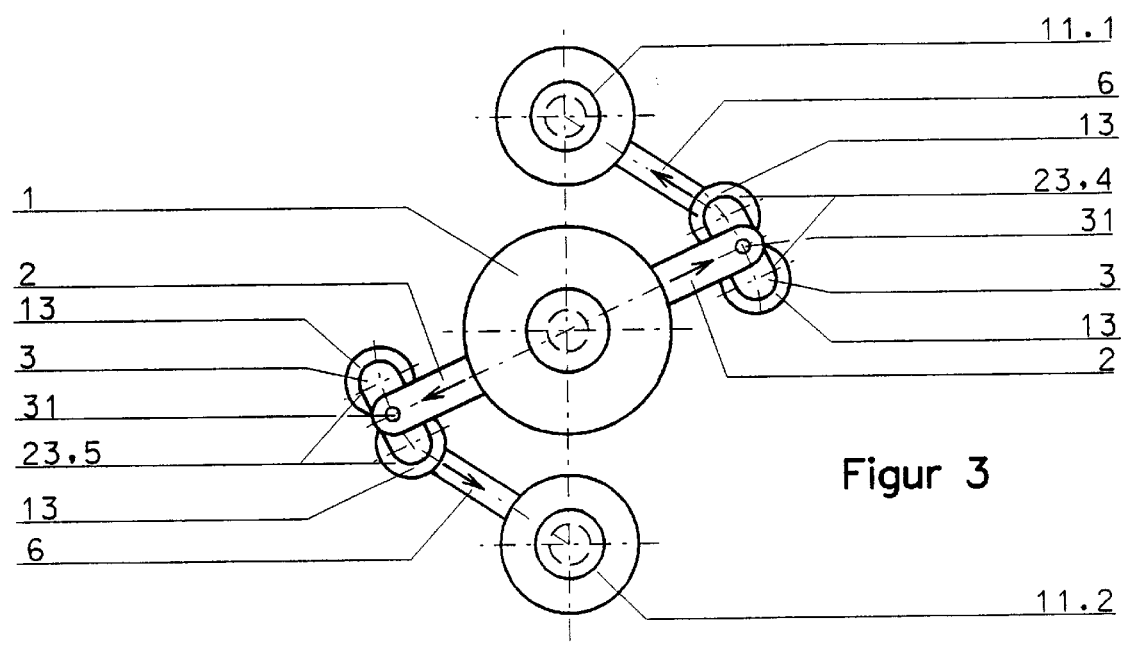
Figur 3
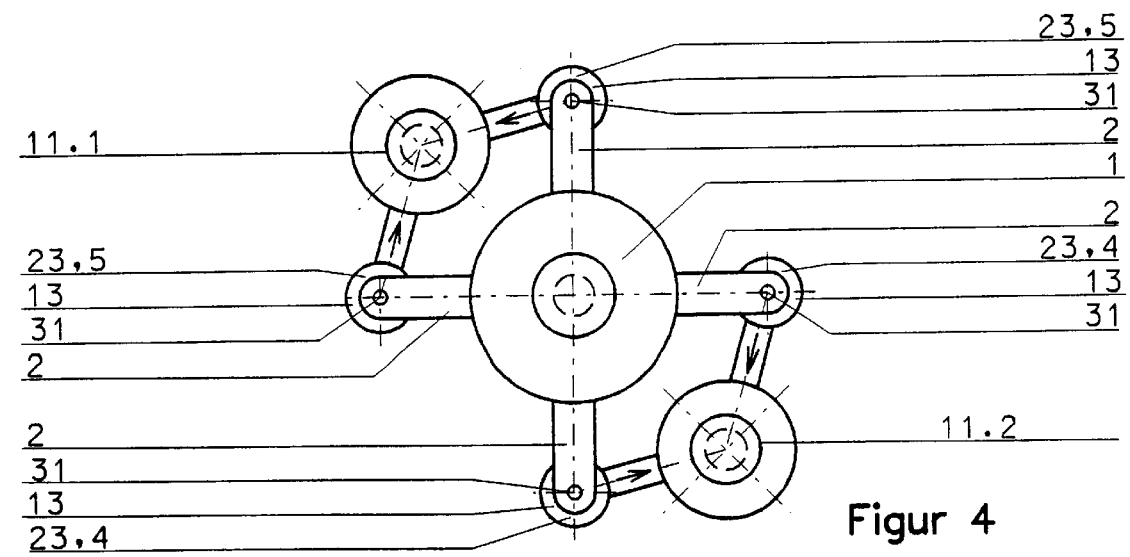
Figur 4

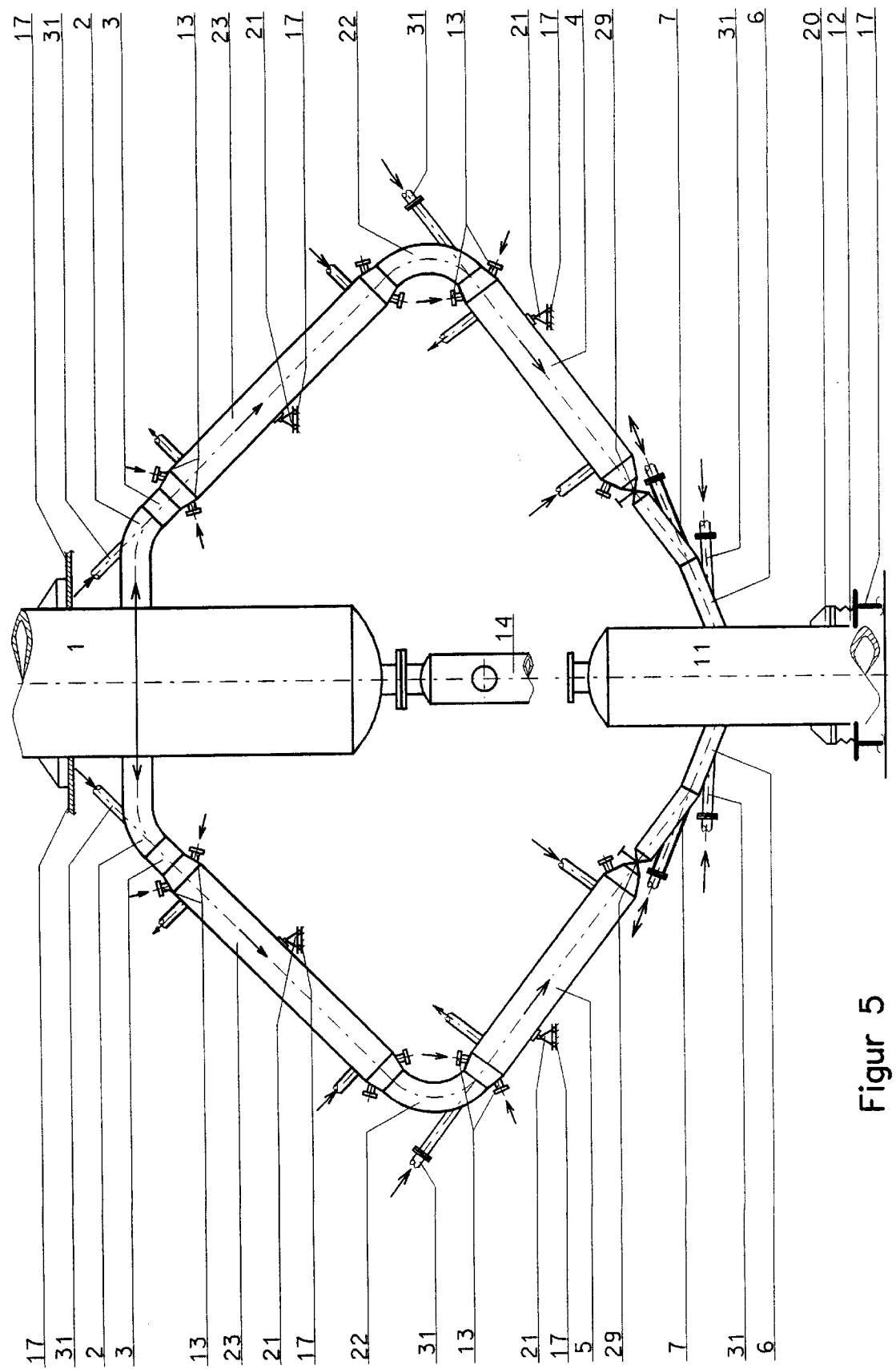
Figur 5

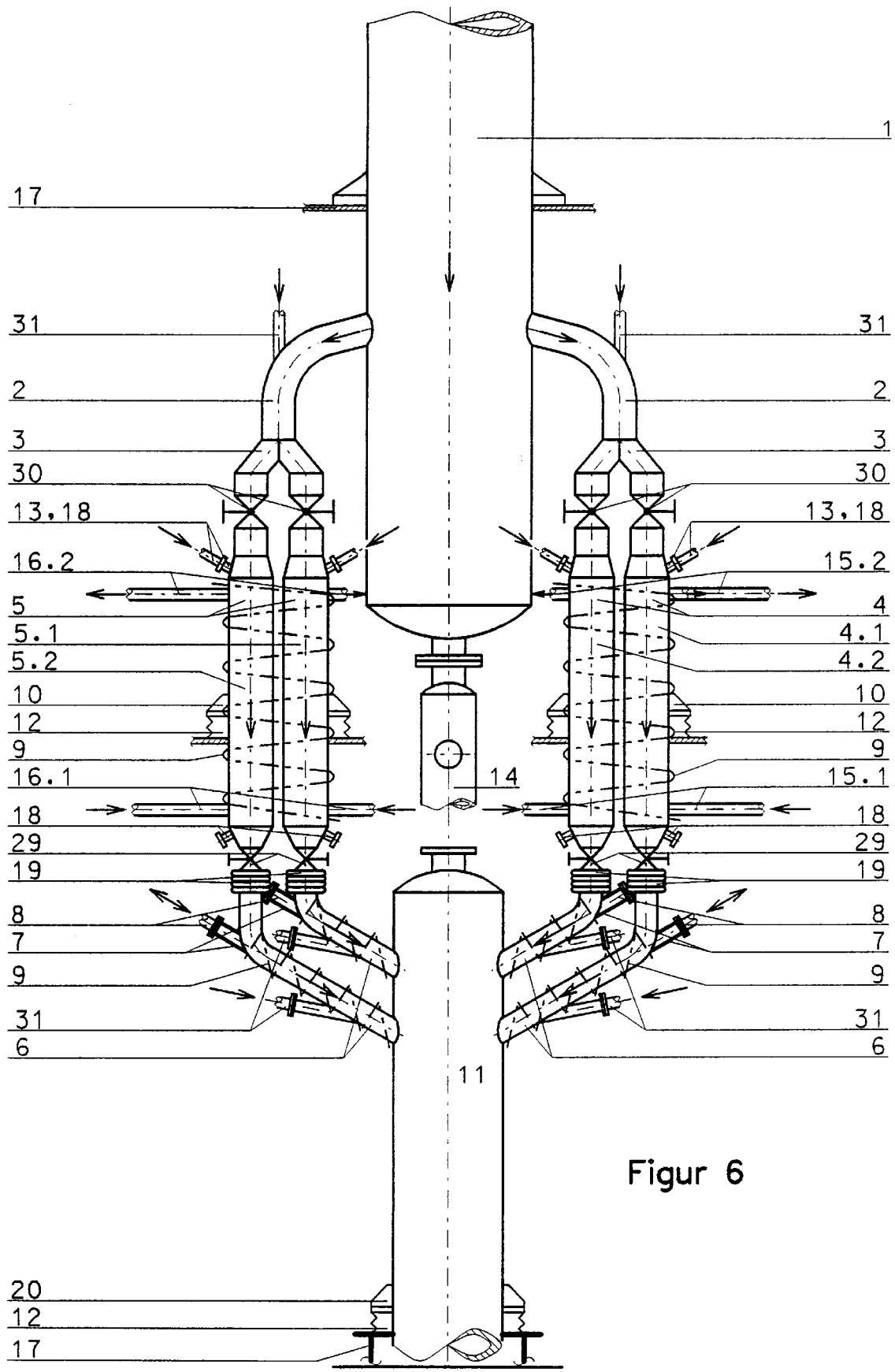
Figur 6

SYNTHESIS GAS HEAT EXCHANGER UNIT

FIELD OF THE INVENTION

The present invention pertains to a synthesis gas heat exchanger unit with one synthesis gas radiant cooler, two synthesis gas convection coolers, one crude gas-clean gas heat exchanger, one crude gas-inert gas heat exchanger, and at least one dust separator with or without a synthesis gas radiant cooler.

BACKGROUND OF THE INVENTION

Heat exchanger units in which the synthesis gas radiant cooler is installed vertically and the synthesis gas convection cooler, the crude gas-clean gas heat exchanger as well as the crude gas-nitrogen heat exchanger are installed horizontally have been known. Even though this arrangement offers the advantage of a small overall height of the equipment installed, it entails the decisive drawback that there is a risk of encrustation and clogging of the horizontal heat exchanger tubes and of the connection lines by the flue dust and slag particles carried by the synthesis gas.

Residual dust remains as a dust deposit in the heat exchanger tubes after the unit has been switched off, because there is no self-cleaning due to the force of gravity of the horizontal tubes. If moisture enters the system during the stopping and/or during the heat-up or start-up period, the residual dust may solidify and bake on the heat exchanger tubes. This is the source of complete clogging of the tubes during the subsequent operation. The units with clogged tubes are no longer able to function, and the consequence of this is the shutdown of the entire unit, loss of production, and later expensive cleaning of the heat exchanger tubes and of the connection lines.

SUMMARY AND OBJECTS OF THE INVENTION

The object of the present invention is therefore to provide a synthesis gas heat exchanger unit, whose self-cleaning from residual particles, dust deposits and other solid particles is improved during the hot operation, during the start-up phase and during shutdown, in which the mass flows in the individual heat exchanger flues are controlled and in which interruptions of operation and increased maintenance costs are avoided.

According to the invention, a synthesis gas heat exchanger unit with one synthesis gas radiant cooler, two synthesis gas convection coolers, one crude gas-clean gas heat exchanger, one crude gas-inert gas heat exchanger and at least one dust separator is provided. At least one synthesis gas convection cooler, one crude gas-clean gas heat exchanger, one crude gas-inert gas heat exchanger with upper connection lines and transition pieces are arranged vertically or with a slope after the synthesis gas radiant cooler on both sides. The synthesis gas convection cooler, the crude gas-clean gas heat exchanger and the crude gas-inert gas heat exchanger are equipped with a soot blower system. The lower connection lines are provided with a crude gas mass flow controller and a dust separator.

According to the present invention, the system for cooling and cleaning the synthesis gas, i.e., heat exchange of crude gas with high- or medium-pressure water, or clean gas or nitrogen has the following functional details:

1) Vertical or sloped arrangement of the equipment for cleaning by the force of gravity,
2) possibility of soot blow-off to eliminate residual dust after the switching off of the unit as well as supporting cleaning of the heat exchanger tubes and connection pipelines during the operation,
3) possibility of adjustment (possibility of control) of the mass flows of the individual heat exchanger lines in the upper feed lines and/or in the connection pipelines to the dust separator,
4) heating (e.g., electric) for start-up processes, preferably at the crude gas heat exchangers and at the lower connection lines,
5) compensation of the thermal expansion by elastic suspension of the synthesis gas convection coolers and of the crude gas or gas heat exchangers, and installation of compensators in the connection pipelines, and
6) accessibility of the inlets and outlets of synthesis gas convection coolers, crude gas-clean gas heat exchangers, and crude gas-nitrogen heat exchangers through access openings (e.g., handholes and manholes).

According to the present invention, the vertical or sloped arrangement of the heat exchangers reliably prevents the development of clogging due to dust in the unit consisting of the following equipment connected to one another vertically or slopingly even during the operation: Synthesis gas radiant cooler, synthesis gas convection cooler, crude gas-clean gas heat exchanger, crude gas-nitrogen heat exchanger, dust separator with mass flow controllers, soot blowers as well as special support.

Due to the vertical or greatly sloped arrangement of the heat exchangers, the force of gravity of the dust particles causes during the operation and after the switching off of the heat exchanger unit that no residual dust can solidify and bake on in the heat exchanger tubes.

Furthermore, the soot blower systems provided can be activated during the operation and after the switching off of the unit and they can supportingly blow the heat exchanger tubes dust-free, so that a premature clogging can be avoided during the operation, on the one hand, and residual deposits can be reliably avoided, on the other hand.

The function and the task of the synthesis gas heat exchanger unit is to cool a synthesis gas, which is generated, e.g., during the gasification of coal, from a combustion temperature, in the range of about 1,850° C. to 1,400° C., to room temperature in order to feed the gas to a downstream cold gas cleaning unit. After this cleaning, the synthesis gas or crude gas has become a so-called "clean gas," which is sent through the crude gas-clean gas heat exchanger for preheating for further use and is then sent to a gas turbine or other users.

If the "hot gas cleaner" currently being developed is to be used, the "cooling path" of the gas is shortened depending on the needs, and the main stream or also the partial stream is sent into the hot gas cleaner.

During the cooling of the synthesis gas in the synthesis gas heat exchanger unit, the sensible heat of the synthesis gas is used to generate steam and to preheat the clean gas and, or nitrogen or inert gases.

The object of the optimization of the unit is to set the inlet and outlet temperatures of the individual equipment. This determines the corresponding geometries of the equipment, and the optimization is to be performed based on such factors as the equipment costs, the efficiency, the quality of function, etc.

When following the path of the gas, it is seen that the synthesis gas flows through the synthesis gas radiant cooler at a relatively low velocity in the direction of the falling slag. The circulating flow in the tubes is directed opposite the gas flow. At the end of the synthesis gas radiant cooler, the synthesis gas leaves the synthesis gas radiant cooler via, e.g., two gas outlet lines offset by 180° and flows into a vertically or slopingly arranged synthesis gas convection cooler with its straight heat exchanger tubes. The synthesis gas flows through these tubes, which are cooled with water in counterflow from the outside. The synthesis gas convection cooler is joined by the gas/to gas heat exchangers, likewise arranged vertically or slopingly (crude gas-clean gas heat exchanger/or crude gas-inert gas heat exchanger). These heat exchangers likewise comprise straight tubes, which are operated in counterflow, parallel flow or cross-flow.

A further cooling of the synthesis gas takes place here, on the one hand, and the cleaned synthesis gas and an inert gas, e.g., nitrogen, which is supplied by an air separation installation, are preheated, on the other hand. The clean gas and the nitrogen are sent to the combustion chamber of a gas turbine, where the clean gas is burned.

The nitrogen reduces the combustion temperature, which prevents (reduces) the formation of nitrogen oxides, and it also increases the volume flow of the gas that is sent to the turbine blades.

The two flues of the synthesis gas convection coolers and of the crude gas/clean gas and crude gas/inert gas heat exchangers with their connection lines are designed as heat exchangers of completely identical shape and are arranged identically; nevertheless, there is a risk of nonuniform mass flow distribution of the synthesis gas in the two flues. If this imbalance of the mass flows is not corrected at the beginning, this imbalance will increase during the running operation. This may lead to the system becoming unable to function and thus to the switching off of the unit.

This imbalance is prevented by controlling the mass flow in every individual flue either before the synthesis gas convection cooler or after the crude gas/to gas heat exchangers in the connection lines leading to the dust separator. It is ensured as a result that all synthesis gas lines will carry the same mass flow of synthesis gas, which leads to a controlled ability of the system to function.

Another measure to avoid cloggings due to dust is to provide the crude gas-clean gas/or crude gas-nitrogen (inert gas) heat exchangers and the lower connection lines with heating in order to prevent preheating and/or start-up from occurring at temperatures below the dew point. The heating may be electric; it is activated during the start-up operation and is switched off during stable operation.

The system according to the present invention is a hot-running system undergoing radial and longitudinal expansions, which must be taken into account at the time of installation. The longitudinal elongations are, of course, most relevant.

The support system has its upper fixed point at the synthesis gas radiant cooler and has elastic supports at the synthesis gas convection coolers and the crude gas-clean gas and crude gas-inert gas heat exchangers, as well as fixed supports or elastic supports at the separator. If necessary, spatial compensators are to be provided at the lower connection lines in order to reduce stresses in the system.

The synthesis gas heat exchanger unit according to the present invention is used, e.g., in a coal-fired power plant with upstream coal gasification plant after the reactor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a front view of the synthesis gas heat exchanger unit;

FIG. 2 is a top view of the synthesis gas heat exchanger unit with a separator;

FIG. 3 is a top view of the synthesis gas heat exchanger unit with two separators;

FIG. 4 is a top view of the synthesis gas heat exchanger unit with individual branches and two separators;

FIG. 5 is a front view of the synthesis gas heat exchanger unit with slopingly arranged heat exchangers; and FIG. 6 is a front view of the synthesis gas heat exchanger unit with gas/gas heat exchangers.

DESCRIPTION OF THE PREFERRED EMBODIMENT

Referring to the drawings in particular, FIG. 1 shows a front view of the heat exchanger unit with the radiant synthesis gas cooler 1 mounted on fixed points 17, from which two upper connection lines 2 lead to the convective synthesis gas coolers 23 via branch pieces 3 and the control fittings 30. Both convective synthesis gas cooler lines are designed as double-flue lines 23.1, 23.2 and are elastically supported 12 via claws 10. The convective synthesis gas coolers 23 have straight fire tubes 27, the heat exchange taking place by cooling water flowing in counterflow, which is fed to the convective synthesis gas cooler 23 via the pipe branches 24 and is drawn off via the pipe branches 25.

A soot blower system 13 is associated with each flue 23.1, 23.2. Soot blowers 31 are also arranged in the connection lines 2. Furthermore, service holes 18 are present at the synthesis gas inlets and outlets of the convective synthesis gas coolers 23.

The synthesis gas, cooled from about 900° C.–600° C. to about 600° C.–300° C., enters the raw gas/clean gas heat exchangers 4.1, 4.2, on the one side, while the synthesis gas is admitted to the raw gas-nitrogen (inert gas) heat exchangers 5.1, 5.2, on the other side.

The above-mentioned heat exchangers 4.1, 4.2, 5.1, 5.2 are supported elastically via brackets 10. They have straight fire tubes 28, the heat exchange taking place via clean gas or inert gas (nitrogen) with the corresponding inlet and outlet pipe branches (clean gas 15.1, 15.2/or nitrogen 16.1, 16.2).

One or more soot blower systems 13 are associated with each flue 4.1, 4.2; 5.1, 5.2. Furthermore, access openings 18 are present in the synthesis gas inlets and outlets of the raw gas/or clean gas heat exchangers 4.1, 4.2 and crude gas-nitrogen heat exchangers 5.1, 5.2, and a heater 9 is likewise provided for the convective synthesis cooler 23 and heat exchangers4. 1, 4.2, 5.1 and 5.2.

The synthesis gas cooled to about 250° C.–180° C. in the heat exchangers 4.1, 4.2, 5.1, 5.2 leaves same via lower connection lines 6 and enters the central dust separator 11, which is mounted with elastic 12 on brackets 20 or is designed as a fixed point 17.

One control fitting 29 and/or one raw gas mass flow controller 7 is installed in the connection lines 6. Pressurized water connections 8, a heating system 9 and special compensators 19, as well as the soot blower system 31 are additionally provided.

A slag crusher 14, into which the slag components separated from the raw or synthesis gas enter, is arranged under the synthesis gas cooler 1.

FIG. 2 shows a top view of the heat exchanger unit with a synthesis gas radiant cooler 1 and a central dust separator 11. The uncleaned raw gas enters both the raw gas/to clean gas heat exchanger 4.1, 4.2 and the raw gas/to nitrogen heat exchanger 5.1, 5.2 via the upper connection lines 2 with adjoining branch pieces 3, control fittings 30 and soot blowers 13, 31 over the synthesis gas convection coolers 23.1, 23.2, and the uniform distribution of the raw gas is controlled via mass flow controllers 7 and control fittings 30 arranged in the lower connection lines 6 and/or via the upper control fitting 30.

FIG. 3 shows a top view of the heat exchanger unit with a radiant syngas cooler I and two decentralized dust separators 11.1 and 11.2. The uncleaned raw gas likewise enters the downstream raw gas/to clean gas heat exchangers 4.1, 4.2 as well as the raw gas/to nitrogen heat exchangers 5.1, 5.2 via the upper connection lines 2 with adjoining branch pieces 3, control fittings 29 and soot blowers 13, 31 over the synthesis gas convection coolers, and uniform distribution of the raw gas is controlled via mass flow controllers 7 and control fittings 29 arranged in the lower connection lines 6.

FIG. 4 shows a top view of the heat exchanger unit with a synthesis gas radiant cooler 1 and two decentralized dust separators 11.1 and 11.2.

Four connection lines 2 are branched off from the synthesis gas radiant cooler 1; they send the crude gas via control fittings 30 and soot blowers 13, 31 and over the convection synthesis gas cooler right hand fine and left hand fine 23.1, 23.2 into the downstream crude gas-clean gas heat exchangers 4.1, 4.2 as well as into the crude gas-nitrogen heat exchangers 5.1, 5.2, and uniform distribution of the raw gas is ensured by mass flow controllers 7 and control fittings 29 arranged in the lower connection lines 6.

Pipe branches 15 for the clean gas inlet and outlet and pipe branches 16 for the nitrogen inlet and outlet are provided for cooling the crude gas to the necessary temperatures.

The lower connection lines 6 are equipped with mass flow controllers 7, pressurized water connections 8, soot blowers 31, as well as a heating system 9. The support on the fixed points 17 is ensured as was described above.

FIG. 5 shows a front view of the heat exchanger unit described before under FIG. 1, but with slopingly arranged convective synthesis gas coolers 23 and slopingly arranged clean gas and nitrogen heat exchangers 4.1, 4.2, 5.1, 5.2, which are connected to one another by middle, curved connection lines 22 with devices for introducing soot blower lances. All heat exchangers are provided at the inlet with a soot blower system 13. Mass flow controllers 7 and control fittings 29 as well as soot blowers 31 are likewise provided in the lower connection lines 6 leading to the central dust separator 11.

The slopingly arranged convective synthesis gas coolers 23 and the clean gas and nitrogen heat exchangers 4, 5 are mounted on fixed points 17 via slide bearings 21 and via elastic supports 12, respectively. The central dust separator 11 is mounted, as was described above, via brackets 20 and elastic support 12 or via fixed supports 17.

FIG. 6 shows a modified arrangement of FIG. 1. The use of the convective synthesis gas coolers was abandoned here, because the outlet temperature from the radiant synthesis gas cooler (gas quencher) is so low that the convective synthesis gas coolers are not needed.

All other elements, such as the soot blowers 13, 31, the raw gas mass flow controller 7, the control fitting 29, the heating system 9, the elastic support 12, the compensators 19, etc., which are described in FIG. 1, are used here.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 1 | Radient syngas cooler |
| 2 | Transition line/upper connection line |
| 3 | Branch piece |
| 4 | Raw gas/clean gas heat exchanger |
| 4.1 | Right-hand flue |
| 4.2 | Left hand flue |
| 5 | Raw gas/inert gas heat exchanger |
| 5.1 | Right-hand flue |
| 5.2 | Left-hand flue |
| 6 | Lower connection line |
| 7 | Raw gas mass flow controller |
| 8 | Pressurized water connection |
| 9 | Heating system |
| 10 | Bracket |
| 11 | Central separator |
| 11.1 | Independent separator after 4 |
| 11.2 | Independent separator after 5 |
| 12 | Elastic support |
| 13 | Soot blower system |
| 14 | Slag crusher |
| 15.1 | Clean gas inlet |
| 15.2 | Clean gas outlet |
| 16.1 | Inert gas inlet |
| 16.2 | Inert gas outlet |
| 17 | Fixed point |
| 18 | Handhole/manhole |
| 19 | Compensator |
| 20 | Bracket |
| 21 | Slide bearing |
| 22 | Middle connection line |
| 23 | Convective syngas cooler |
| 23.1 | Right-hand flue |
| 23.2 | Left-hand flue |
| 24 | Cooling water inlet |
| 25 | Cooling water outlet |
| 27 | Fire tube |
| 28 | Fire tube |
| 29 | Control fitting |
| 30 | Control fitting |
| 31 | Soot blower |

What is claimed is:

1. A synthesis gas heat exchanger device for cooling crude synthesis gas, the device comprising:

a radiant synthesis gas cooler;

a first convective synthesis gas cooler including a vertical upper section and a vertical lower section connected to said upper section, an outside of said upper and lower section including a water-cooling structure, said first convective cooler lower section being a crude gas to clean synthesis gas heat exchanger;

a second convective synthesis gas cooler including a vertical upper section and a vertical lower section connected to said upper section, an outside of said upper and lower section including a water-cooling structure, said second convective cooler lower section being a crude gas to inert gas heat exchanger;

a clean synthesis gas feed connected to said first convective synthesis gas cooler;

an inert gas feed connected to said second convective synthesis gas cooler;

a cooling water feed connected to each of said first convective synthesis gas cooler water-cooling structure and said second convective synthesis gas cooler water-cooling structure;

a first upper connection line;

a first transition piece, a top of said first convective cooler being connected to said first transition piece, said first transition piece being connected to said first upper connection line which is connected to said radiant cooler;

a second upper connection line;

a second transition piece, a top of said second convective cooler being connected to said second transition piece, said second transition piece being connected to said second upper connection line which is connected to said radiant cooler;

a first lower connection;

a second lower connection;

a dust separator, a lower end of said first convective cooler being connected to said dust separator by said first lower connection, a lower end of said second convective cooler being connected to said dust separator by said second lower connection;

a soot blower for removing soot from the device, said soot blower being positioned with a connection at each of said first upper connection line and said second upper connection line, at each upper and lower section of each of said first convective synthesis gas cooler and said second convective synthesis gas cooler and at each of said first lower connection line and said second lower connection line;

a raw gas mass flow controlling device positioned at each of said first lower connection line and said second lower connection line; and a feeding device for feeding pressurized water at each of said first lower connection and said second lower connection line upstream of said mass flow controlling device.

2. The device in accordance with claim 1, wherein said first and second convective synthesis gas coolers are multiple-flue coolers.

3. The device in accordance with claim 1, wherein said crude gas to clean gas heat exchanger and said crude gas to inert gas heat exchanger are multiple-flue coolers.

4. The device in accordance with claim 1, wherein said first convective synthesis gas cooler, said second convective synthesis gas cooler, said first lower connection line and said second lower connection line are equipped with an electric heater.

5. The device in accordance with claim 1, wherein spatial compensators are provided at the inlet in said lower connection lines whereby expansion and contraction of components of the device are compensated for.

6. The device in accordance with claim 1, wherein said radiant synthesis gas radiant cooler is secured via a fixed-point support, and said first and second convective synthesis gas coolers are secured via brackets on elastic supports.

7. The device in accordance with claim 1, wherein said dust separator includes a central dust separator and individual dust separators secured via brackets on elastic supports or via fixed-point supports.

8. The device in accordance with claim 1, further comprising: a control fitting in each of said first upper connection line and said second upper connection line.

* * * * *